Nov. 23, 1926.

W. W. COGSWELL

AIRSHIP

Filed Feb. 16, 1925

1,608,461

INVENTOR:
WILLIAM W. COGSWELL,
By Martin P. Smith
ATTY.

Patented Nov. 23, 1926.

1,608,461

UNITED STATES PATENT OFFICE.

WILLIAM W. COGSWELL, OF LOS ANGELES, CALIFORNIA.

AIRSHIP.

Application filed February 16, 1925. Serial No. 9,620.

My invention relates to an airship, and has for its principal object, the provision of a relatively simple, and practical airship that combines the desirable features of a dirigible balloon and a helicopter.

Further objects of my invention are, to provide an airship having an elongated substantially cigar-shaped body that is made buoyant or semibuoyant by the employment of helium or other suitable gas; to arrange in said body, a plurality of longitudinally disposed tubes and a plurality of vertically disposed tubes, the same serving as air tunnels; to mount for operation within tubes or air tunnels; propeller-carrying shafts that are driven by suitable motors or engines and to arrange on the sides of the body of the ship, longitudinally disposed laterally projecting wings or planes that function as stabilizers to maintain the ship body on an "even keel" while in flight.

With the foregoing and other objects in view, my invention consists in certain novel features of construction and arrangement of parts that will be hereinafter more fully described and claimed and illustrated in the accompanying drawings in which:

Figure 1:
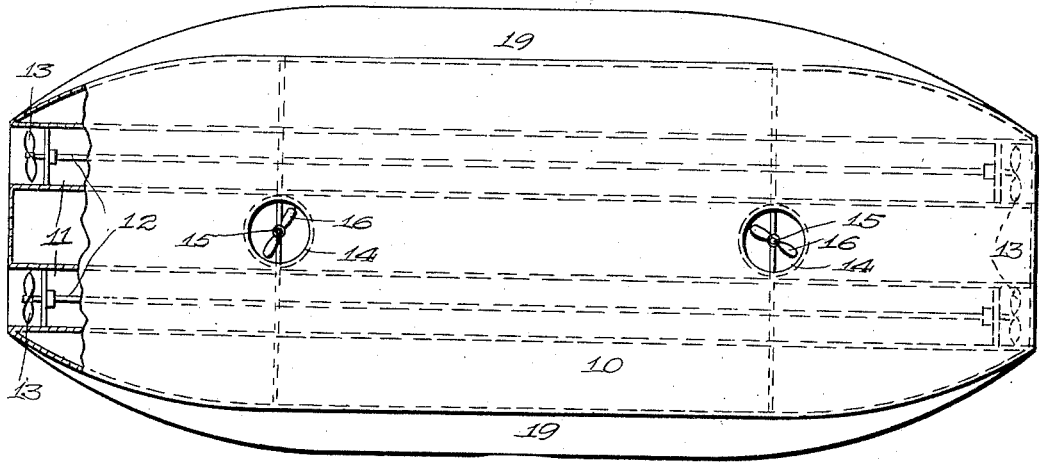
Fig. 1 is a top plan view of an airship of my improved construction.
Figure 2:
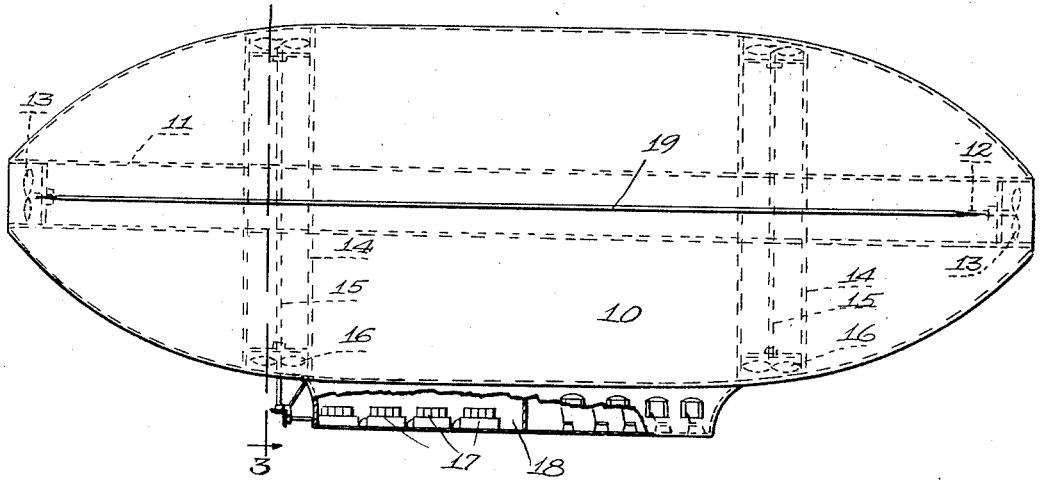
Fig. 2 is a side elevational view of the ship.

Referring by numerals to the accompanying drawings which illustrate a practical embodiment of my invention, 10 designates the body of the airship, which body is substantially cylindrical in shape, with both ends tapered. This body comprises a suitable framework that is covered by an envelope or thin sheathing of aluminum plates or suitable waterproof fabric.

Extending lengthwise through the central portion of the body 10, is a pair of substantially cylindrical tubes or tunnels 11, open at both ends and arranged for rotation in suitable bearings with each tube, is an axially disposed shaft 12, carrying on each end a propeller 13. I prefer to arrange these propellers just inside the open ends of the tubes 11.

Vertically arranged in the body 10 and located at suitable points between the longitudinal center of said body and the ends thereof are tubes or tunnels 14, that are open at both ends and arranged for rotation in suitable bearings within said tubes are axially disposed shafts 15 that carry at their ends, propellers 16.

The propeller-carrying shafts 12 and 15 may be driven in any suitable manner, but I prefer to use as the driving means, a series of motors such as internal combustion engines 17, the same being located within a cabin structure 18 that depends from the central portion of body 10. This cabin may also contain suitable storage compartments and quarters for the ship's passengers and the crew.

I prefer to arrange the driving connections between the motors and the propeller-carrying shafts so that each shaft has an independent driving motor.

Arranged on the sides of body 10 are outwardly projecting horizontally disposed wings or planes 19 that extend the entire length of said body. These wings function as stabilizers for the ship while the same is in flight, and counteract any tendency of the body to roll or rock.

In the operation of my improved airship, the buoyant gas containers within the body are inflated to such a degree as that said body and its head will be practically self-sustaining in the air, but without sufficient buoyancy to move upward in the air.

To cause the airship to ascend, the motors that drive the propeller-carrying shafts 15 are operated with the result that air will be forcibly drawn downward through the vertical tubes 14 and which action produces a lifting effect on body 10, and the latter rises after the manner of a helicopter.

When the ship has reached the desired height, the motors that drive the vertical shafts 15 are stopped and the motors that drive the propeller-carrying shafts 12 are started.

As a result, air is drawn into and forcibly driven through tubes or tunnels 11, thereby moving the airship forwardly, depending of course, on the direction in which the propeller-carrying shafts are rotated.

Figure 3:
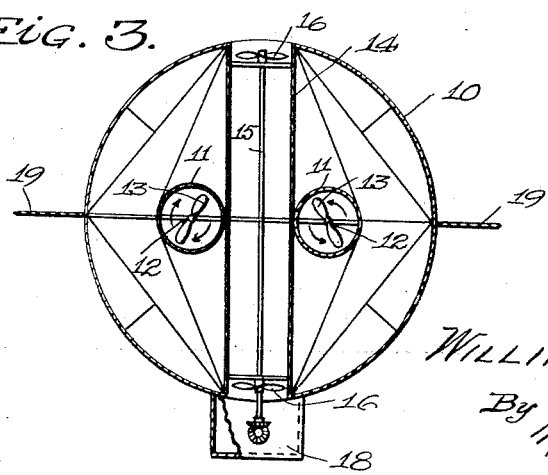
Fig. 3 is a cross section taken on the line 3—3 of Fig. 2.

While the ship is being driven forwardly or rearwardly, shafts 12 are rotated toward each other, as shown by the arrows in Fig. 3; and thus, the torsional strains developed in the driving shafts are counterbalanced, and the ship will travel forwardly or backwardly in practically a straight path.

When it is desired to cause the ship to turn laterally during the forward flight, one of the propeller carrying shafts 12 is stopped or caused to rotate so that air will be drawn from the rear, forwardly through the corresponding tube or tunnel and, as a result, the ship will make a gradual turn as it moves forward.

By providing each shaft with two propellers and arranging the latter adjacent to the ends of the tubes or tunnels, the speed of travel of the air throughout the lengths of the tubes is made uniform and the surface friction of the air volume passing through said tubes is equalized and at the same time minimized.

Thus it will be seen that I have provided a simple, practical and easily operated airship that combines all the desirable qualities of a dirigible balloon and a helicopter.

It will be understood that minor changes in the size, form, and construction of the various parts of my improved construction may be made and substituted for those herein shown and described without departing from the spirit of the invention, the scope of which is set forth in the appended claim.

I claim as my invention:

An airship comprising an elongated body having tapered ends, a pair of straight open-ended tubes extending lengthwise through said body, which tubes occupy the same horizontal plane and their internal diameters being uniform throughout their lengths, shafts extending lengthwise through said tubes, propellers carried by said shafts and arranged immediately adjacent to the open ends of said tubes, straight vertically disposed tubes extending through the body of the airship and located between the longitudinally disposed tubes the internal diameters of which vertical tubes are uniform throughout their lengths, shafts extending through said vertical tubes and propellers mounted on the shafts within the vertical tubes immediately adjacent to the ends of the latter.

In testimony whereof I affix my signature.

WILLIAM W. COGSWELL.